(12) United States Patent
Jung

(10) Patent No.: US 10,243,227 B2
(45) Date of Patent: Mar. 26, 2019

(54) APPARATUS FOR REDUCING HYDROGEN CONCENTRATION IN EXHAUST GAS OF AN EXHAUST SYSTEM FOR A FUEL CELL VEHICLE

(71) Applicants: HYUNDAI MOTOR COMPANY, Seoul (KR); KIA MOTORS CORPORATION, Seoul (KR)

(72) Inventor: Myung Ju Jung, Daejeon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/640,723

(22) Filed: Jul. 3, 2017

(65) Prior Publication Data
US 2018/0159159 A1    Jun. 7, 2018

(30) Foreign Application Priority Data
Dec. 6, 2016    (KR) .......... 10-2016-0165280

(51) Int. Cl.
| | | |
|---|---|---|
| B60R 19/48 | (2006.01) | |
| H01M 8/0662 | (2016.01) | |
| B60L 11/18 | (2006.01) | |
| B62D 35/00 | (2006.01) | |

(52) U.S. Cl.
CPC ....... *H01M 8/0662* (2013.01); *B60L 11/1881* (2013.01); *B60R 19/48* (2013.01); *B62D 35/007* (2013.01); *H01M 2250/20* (2013.01)

(58) Field of Classification Search
CPC .... H01M 8/0662; B60R 19/02; B60R 19/023; B60R 19/49; B60R 2018/486; B60K 13/04; B60K 13/06
See application file for complete search history.

(56) References Cited

U.S. PATENT DOCUMENTS

| | | | | |
|---|---|---|---|---|
| 6,426,158 B1 * | 7/2002 | Pratt | ............... | H01M 8/0662 |
| | | | | 429/408 |
| 6,916,563 B2 * | 7/2005 | Yamamoto | ......... | H01M 8/0662 |
| | | | | 429/408 |
| 7,358,002 B2 * | 4/2008 | Kanai | ............... | H01M 8/04097 |
| | | | | 422/224 |
| 7,727,315 B2 * | 6/2010 | Son | ............... | H01M 8/04164 |
| | | | | 96/155 |
| 8,851,219 B2 * | 10/2014 | Yoshida | ............... | B60K 1/00 |
| | | | | 180/65.31 |

(Continued)

FOREIGN PATENT DOCUMENTS

| | | | |
|---|---|---|---|
| JP | 2005073463 A | * | 3/2005 |
| JP | 2007176468 A | * | 7/2007 |

(Continued)

*Primary Examiner* — James A Shriver, II
*Assistant Examiner* — Steve Clemmons
(74) *Attorney, Agent, or Firm* — Lempia Summerfield Katz LLC

(57) ABSTRACT

An apparatus for reducing hydrogen concentration in exhaust gas of an exhaust system of a fuel cell vehicle includes a bumper cover disposed at a rear portion of the fuel cell vehicle, the bumper cover forming a streamlined exterior surface, and an exhaust gas guiding unit interconnecting the exhaust system and the bumper cover, the exhaust gas guiding unit guiding the exhaust gas to the streamlined exterior surface of the bumper cover.

7 Claims, 9 Drawing Sheets

(56) References Cited

U.S. PATENT DOCUMENTS

| | | | |
|---|---|---|---|
| 9,196,914 B2* | 11/2015 | Yoshida | B60K 1/00 |
| 9,413,027 B2* | 8/2016 | Noh | H01M 8/2465 |
| 9,764,687 B2* | 9/2017 | Okuyama | B60Q 5/008 |
| 2003/0037983 A1* | 2/2003 | Hanaya | B60K 13/04 |
| | | | 180/309 |
| 2004/0149515 A1* | 8/2004 | Toyoshima | F01N 1/089 |
| | | | 181/258 |
| 2006/0083975 A1* | 4/2006 | Ahn | H01M 8/04305 |
| | | | 429/415 |
| 2008/0070090 A1* | 3/2008 | Yoshizumi | H01M 8/04089 |
| | | | 429/410 |
| 2009/0045006 A1* | 2/2009 | Kondo | F01N 1/04 |
| | | | 181/252 |
| 2015/0180065 A1* | 6/2015 | Kwon | H01M 8/04231 |
| | | | 429/444 |

FOREIGN PATENT DOCUMENTS

| | | | |
|---|---|---|---|
| JP | 4400046 B2 * | 1/2010 | |
| JP | 2016104602 A * | 6/2016 | |
| KR | 1020020067765 A | 8/2002 | |
| KR | 20090005815 A * | 1/2009 | |
| KR | 20160049307 A * | 5/2016 | |

* cited by examiner

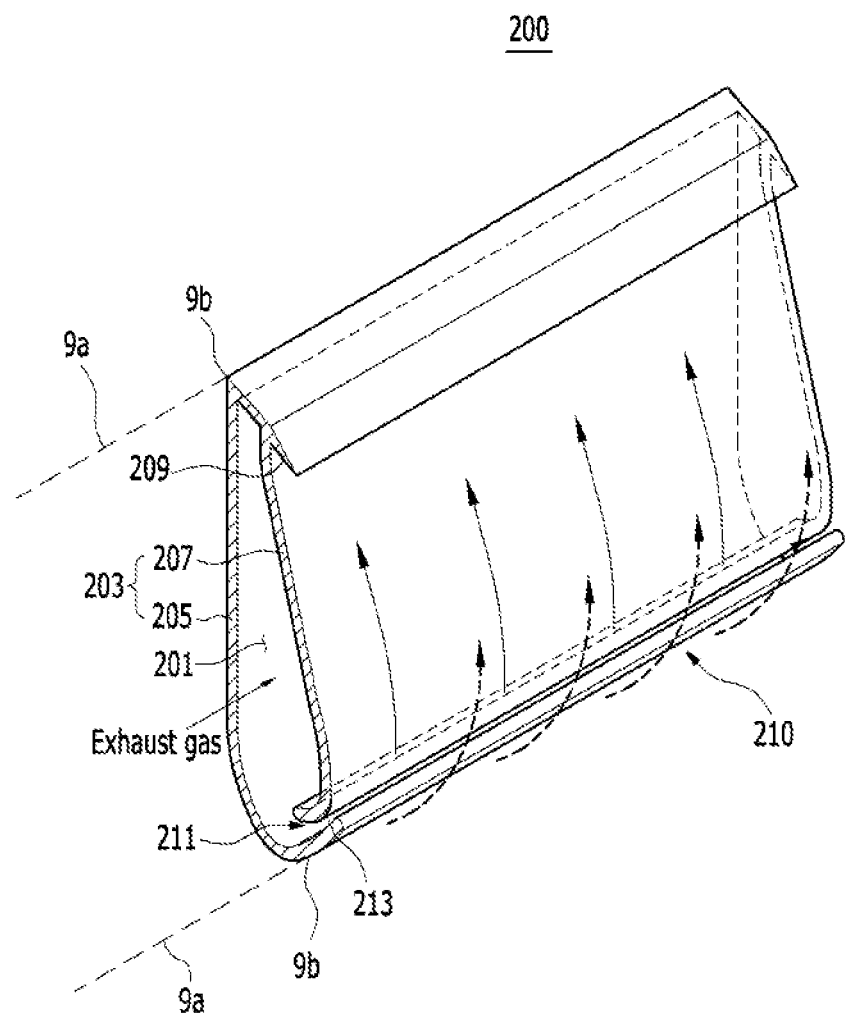

(a)

(b)

(a)

(b)

(a)

(b)

APPARATUS FOR REDUCING HYDROGEN CONCENTRATION IN EXHAUST GAS OF AN EXHAUST SYSTEM FOR A FUEL CELL VEHICLE

CROSS-REFERENCE TO RELATED APPLICATION

This application claims priority to and the benefit of Korean Patent Application No. 10-2016-0165280 filed in the Korean Intellectual Property Office on Dec. 6, 2016, the entire contents of which are incorporated herein by reference.

BACKGROUND

Field of the Disclosure

The present disclosure relates to an apparatus for reducing hydrogen concentration in exhaust gas of an exhaust system of a fuel cell vehicle.

Description of the Related Art

In general, a fuel cell system is a kind of a power generating system that supplies air and hydrogen to a fuel cell to generate electrical energy by an electrochemical reaction between hydrogen and oxygen by the fuel cell. For example, the fuel cell system is used to drive a driving source such as an electric motor in a vehicle, a ship, a train, or a plane.

The fuel cell system includes a stack in which fuel cells are stacked, a hydrogen supply unit that supplies hydrogen to fuel electrodes of the fuel cells, an air supply unit that supplies air to air electrodes of the fuel cells, and a heat/water management unit that controls an operating temperature of the stack by removing heat and water resulting from fuel cell reaction.

Meanwhile, in the case of a polymer fuel cell, an appropriate amount of moisture allows an ion exchange membrane of a membrane-electrode assembly (MEA) to smoothly operate. To this end, the air supply device of the fuel cell system includes a humidification device for humidified air supplied to the fuel cell.

For example, the humidification device humidifies dried air supplied through an air compressor of the air supply device using moisture in high temperature and high humidity air exhausted from the cathode of the fuel cell, and supplies the humidified air to the cathode of the fuel cell.

Further, the fuel cell system includes a hydrogen re-circulating unit that mixes hydrogen discharged from the fuel electrodes of the fuel cells with hydrogen supplied from the hydrogen supply unit to supply the mixture to the fuel electrodes.

Meanwhile, impurities such as nitrogen and water vapor are accumulated to decrease a concentration of hydrogen in the fuel electrodes of the fuel cells during an operation of the fuel cell system, and when the concentration of the hydrogen is excessively decreased, cell omission may occur in the fuel cell stack.

In order to address this problem, in the fuel cell system, a purge valve is provided on the hydrogen discharge side of the fuel cell stack. By periodically opening the purge valve, the impurities and the hydrogen are discharged. The hydrogen concentration of the fuel electrodes is thus maintained at more than a certain level.

When the purge valve is opened to purge the fuel electrodes, the fuel electrodes discharge the impurities and the hydrogen, and the purge gas is introduced into the humidifying device together with the air discharged from the fuel cell stack.

Thereafter, water vapor in the impurities is used as a humidifying source of the reactant gas for the electrochemical reaction of the fuel cell in the humidifying device, and gases such as hydrogen and nitrogen are discharged into the atmosphere through an exhaust line of the humidifying device.

Accordingly, such a hydrogen purge method is a technique for obtaining a dilution effect of purge hydrogen by mixing hydrogen discharged from the fuel electrode with air discharged through the air discharge line from the fuel cell stack.

While starting and stopping of the fuel cell system or in an idle condition (for example, an Idle, Stop, and Go (ISG) condition of the fuel cell vehicle) of a fuel cell vehicle employing the fuel cell system, a substantive amount of hydrogen that crosses over from the fuel electrode to the air electrode through a membrane may be exhausted.

In this case, the hydrogen together with the air is exhausted from the air electrode of the fuel cells to a humidifying device, diluted by air at the humidifier, and then exhausted to an atmosphere with reduced concentration.

However, according to the conventional scheme, although the hydrogen exhausted from the fuel cell system is mixed in the humidifier with air exhausted from the air electrode so as to reduce the hydrogen concentration, it is difficult to realize a sufficient mixing effect and the hydrogen concentration may not be sufficiently reduced.

Therefore, hydrogen concentration exhausted from the fuel cell system may not be effectively reduced, and highly dense hydrogen may be exhausted depending on the driving condition of the fuel cell system, which implies a possibility of ignition and explosion of the exhaust gas.

The above information disclosed in this Background section is only for enhancement of understanding of the background of the disclosure. Therefore the Background section may contain information that does not constitute prior art.

SUMMARY OF THE DISCLOSURE

The present disclosure provides an apparatus for reducing hydrogen concentration in exhaust gas of an exhaust system of a fuel cell vehicle. The apparatus may be useful for effectively reducing the hydrogen concentration of exhaust gas of a fuel cell system of a fuel cell vehicle.

An apparatus for reducing hydrogen concentration in exhaust gas of an exhaust system of a fuel cell vehicle according to an embodiment may include a bumper cover and an exhaust gas guiding unit. The bumper cover may be disposed at a rear portion of the fuel cell vehicle, and the bumper cover forms a streamlined exterior surface. The exhaust gas guiding unit may interconnect the exhaust system and the bumper cover and guide the exhaust gas to the streamlined exterior surface of the bumper cover.

While the exhaust gas may be guided to the streamlined exterior surface of the bumper cover, hydrogen in the exhaust gas may flow along the streamlined exterior surface of the bumper cover, thereby being diffused to, and diluted by, an exterior air.

The exhaust gas guiding unit may include an extension portion formed by extending an exhaust end of the exhaust system and connected with a bottom of the bumper cover.

An apparatus for reducing hydrogen concentration in exhaust gas of an exhaust system of a fuel cell vehicle according to another embodiment may include a bumper cover and an air amplifier. The bumper cover may be disposed at a rear portion of a vehicle, forming a closed space connected with an exhaust end of the exhaust system, and forming a streamlined exterior surface where the close space may be connected with a rear of the bumper cover by a gap formed along a length direction of the bumper cover. The air amplifier may exhaust the exhaust gas to the streamlined exterior surface through the gap and guiding an exterior air to the streamlined exterior surface.

The air amplifier may guide the exhaust gas to stick to, and flow along, the streamlined exterior surface of the bumper cover. As a result, hydrogen in the exhaust gas is diffused to, and diluted by, the exterior air.

The bumper cover may be formed in a shape of a hollow loop in cross-section. The streamlined curved surface may be formed as a rear surface of the bumper cover. The rear surface may be overlapped by a front surface with the gap at a bottom of the bumper cover.

A blocking protrusion may be formed at a top of the bumper cover so as to block hydrogen contained in the exhaust gas from flowing upward.

An apparatus for reducing hydrogen concentration in exhaust gas of an exhaust system of a fuel cell vehicle according to yet another embodiment may include a collecting member, at least one passage member, and an exhaust portion. The collecting member may be installed at an interior of a bumper cover disposed at a rear portion of the fuel cell vehicle and collect the exhaust gas exhausted from the exhaust system.

The at least one passage member may be disposed in a length direction of the bumper cover at the interior of the bumper cover and be connected with the collecting member so as to allow the collected gas to flow along the length direction. The exhaust portion may be connected with the at least one passage member, formed along the length direction of the bumper cover, exhaust the exhaust gas inside the at least one passage member, and guide the exhausted gas toward the streamlined exterior surface of the bumper cover.

The collecting member may be fixed to the bumper cover at an interior of the bumper cover. The at least one passage member may be fixed to the bumper cover at the interior of the bumper cover.

The collecting member may be formed as a housing that includes a first port connected with the exhaust system, a second port connected with the at least one passage member, and a third port for draining moisture contained in the collected exhaust gas.

A water trap valve for selectively opening/closing the third port may be provided at the third port.

The exhaust portion may include an exhaust slit formed along the length direction of the bumper cover.

Each of the at least one passage member may be provided with a connection slit formed along the length direction of the bumper cover, where the connection slit may be connected with the exhaust slit.

The exhaust slit may be located upward and rearward with respect to the connection slit, such that the exhaust gas may move upward and rearward while flowing from the connection slit to the exhaust slit.

The connection slit and the exhaust slit may be interconnected by a connection passage.

The exhaust portion may include a plurality of exhaust holes formed with a predetermined spacing along the length direction of the bumper cover.

Each of the at least one passage member may be provided with a plurality of connection holes that are formed in the length direction and respectively connected with the plurality of exhaust holes.

The plurality of exhaust holes may be located upward and rearward with respect to the plurality of connection holes, such that the exhaust gas may move upward and rearward while flowing from the plurality of connection holes to the plurality of exhaust holes.

The plurality of connection holes and the plurality of exhaust holes may be interconnected by a plurality of connection passages.

An apparatus for reducing hydrogen concentration in exhaust gas of an exhaust system of a fuel cell vehicle according to yet another embodiment may include a collecting member and an exhaust portion. The collecting member may be installed at an interior of a bumper cover disposed at a rear portion of the fuel cell vehicle, collect exhaust gas exhausted from the exhaust system, and exhaust the collected exhaust gas to the interior of the bumper cover. The bumper cover may form a streamlined exterior surface. The exhaust portion may include a mesh screen formed at the bumper cover, discharge exhaust gas at the interior of the bumper cover to an exterior of the bumper cover, and guide the discharged gas to the streamlined exterior surface of the bumper cover.

According to disclosed embodiments, exhaust gas containing hydrogen and air is guided to a streamlined exterior surface of a rear bumper cover, and diffused to and diluted by an exterior air.

Thus, by utilizing the bumper at a rear portion of a fuel cell vehicle in order to reduce hydrogen concentration in the exhaust gas by diluting the exhaust gas by an exterior air, hydrogen concentration in the exhaust gas may be effectively reduced.

Further effects that can be obtained or expected from the disclosed embodiments are directly or suggestively described in the following detailed description. That is, various effects expected from the disclosed embodiments will be described in the following detailed description.

BRIEF DESCRIPTION OF THE DRAWINGS

FIG. 3A and FIG. 3B are a schematic views of an apparatus for reducing hydrogen concentration in exhaust gas of an exhaust system of a fuel cell vehicle according to a second disclosed embodiment.

Figure 1:
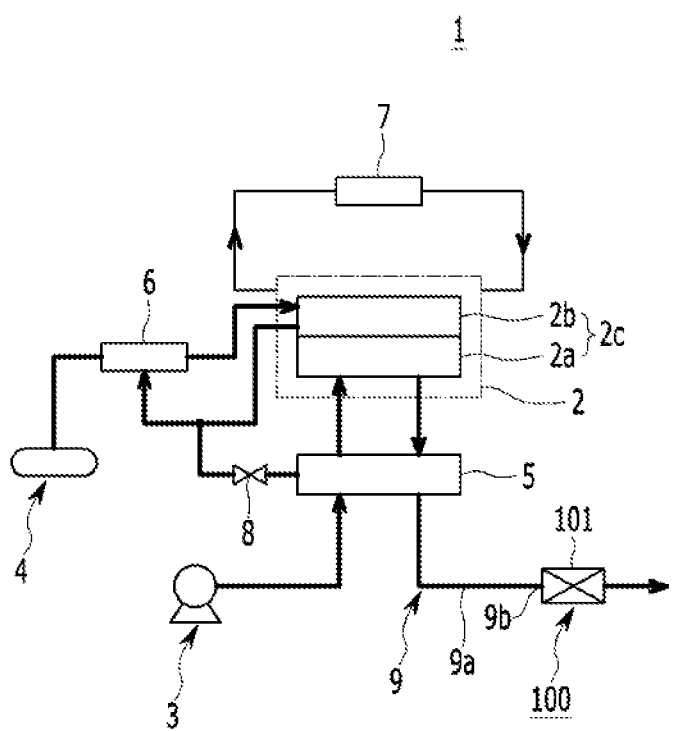
FIG. 1 is a block diagram of a fuel cell system in which an apparatus in accordance with the disclosed embodiments is applied.

The following reference symbols are used throughout the drawings and the following Detailed Description section:

| | | | |
|---|---|---|---|
| 1: | fuel cell system | 2: | fuel cell stack |
| 2a: | air electrode | 2b: | fuel electrode |
| 2c: | fuel cell | 3: | air supply unit |
| 4: | hydrogen supply unit | 5: | humidifier |
| 6: | hydrogen recirculation unit | 7: | heat/water management unit |
| 8: | purge valve | 9: | exhaust system |
| 9a: | exhaust line | 9b: | exhaust end |
| 101: | bumper | 103, 203, 303, 403: | bumper cover |
| 110, 210, 310, 410: | exhaust gas guiding unit | 205: | front surface |
| 111: | extension portion | 209: | blocking protrusion |
| 201: | closed space | 213: | gap |
| 207, 307, 407: | rear surface | 313: | first port |
| 211: | air amplifier | 317: | third port |
| 311, 411: | collecting member | 331: | passage member |
| 315: | second port | 333a: | connection hole |
| 321: | water trap valve | 353: | exhaust slit |
| 333: | connection slit | 371: | connection passage |
| 351, 451: | exhaust portion | 490: | mesh screen |
| 353a: | exhaust hole | | |
| 413: | intake port | | |

DETAILED DESCRIPTION

The present disclosure will be described more fully hereinafter with reference to the accompanying drawings, in which disclosed embodiments are shown. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

The size and the thickness of each component illustrated in the drawings are arbitrarily illustrated in the drawings for better understanding and ease of description, but the present disclosure is not limited to the illustration. In the drawings, the thicknesses of various portions and regions are enlarged for clarity.

In the following description, dividing names of components into first, second and the like is to divide the names because the names of the components are the same as each other and an order thereof is not particularly limited.

In addition, unless explicitly described to the contrary, the word "comprise" and variations such as "comprises" or "comprising", will be understood to imply the inclusion of stated elements but not the exclusion of any other elements.

In addition, the terms "~unit", "~means", "~part", and "member" described in the specification mean units of a comprehensive configuration for performing at least one function and operation.

FIG. 1 is a block diagram of a fuel cell system in which an apparatus in accordance with disclosed embodiments is applied.

Referring to FIG. 1, a fuel cell system 1 applied with the disclosed embodiments is an electricity generator system generating electrical energy by an electrochemical reaction of fuel and an oxidizer, and may be installed in a fuel cell vehicle that drives an electric motor by electrical energy.

In the disclosed embodiments, fuel used in the fuel cell system 1 is called hydrogen gas (hereinafter, called "hydrogen" for convenience), and an oxidizer used in the fuel cell system 1 is called air.

Such a fuel cell system 1 includes a fuel cell stack 2, an air supply unit 3, a hydrogen supply unit 4, a humidifier 5, a hydrogen recirculation unit 6, and a heat/water management unit 7.

The fuel cell stack 2 is an accumulated assembly of fuel cells 2c, respectively including a membrane (not shown), an air electrode 2a, and a fuel electrode 2b. The fuel cells 2c are supplied with hydrogen by the fuel electrode 2b and air by the air electrode 2a, and generates electrical energy by an electrochemical reaction of hydrogen and oxygen.

The air supply unit 3 is driven by electricity and supplies atmospheric air to the air electrode 2a of the fuel cells 2c. The air supply unit 3 may include an air compressor or an air blower. The hydrogen supply unit 4 stores compressed hydrogen and may include a hydrogen tank for supplying the compressed hydrogen to the fuel electrode 2b of the fuel cells 2c.

The humidifier 5 may include a membrane humidifier that humidifies air supplied from the air supply unit 3 by using an exhaust air containing moisture and exhausted from the air electrode 2a of the fuel cells 2c, and supplies the humidified air to the air electrode 2a.

The hydrogen recirculation unit 6 recirculates hydrogen exhausted from the fuel electrode 2b of the fuel cells 2c to the fuel electrode 2b. The hydrogen recirculation unit 6 may mix the hydrogen exhausted from the fuel electrode 2b and the hydrogen supplied from the hydrogen supply unit 4 and supply the mixed hydrogen to the fuel electrode 2b.

The heat/water management unit 7 eliminates heat and water formed by the electrochemical reaction of the fuel cells 2c, and thereby controls an operating temperature of the fuel cell stack 2.

The above constituent elements of such a fuel cell system 1 may be formed as known in the art.

When a fuel cell vehicle installed with the fuel cell system is being started, the fuel cell system 1 exhausts hydrogen by a cross-over together with air from the air electrode 2a of the fuel cells 2c, and exhausts purge hydrogen from the fuel electrode 2b of the fuel cells 2c.

In addition, the fuel cell system 1 exhausts only purge hydrogen from the fuel electrode 2b of the fuel cells 2c during a driving of the vehicle. When the vehicle is stopped or in an idle state (for example, in the case of an Idle, Stop, and Go (ISG) condition), the fuel cell system 1 exhausts hydrogen by a cross-over together with air from the air electrode 2a of the fuel cells 2c.

The cross-over hydrogen means hydrogen that crosses over from the fuel electrode 2b of the fuel cells 2c to the air electrode 2a through the membrane by a residual pressure.

The purge hydrogen means hydrogen exhausted from the fuel electrode 2b together with impurities by an operation of the purge valve 8, so as to remove impurities such as nitrogen and water vapor accumulated in the fuel electrode 2b of the fuel cells 2c.

The hydrogen exhausted from the fuel cells 2c may be supplied to the humidifier 5, and exhausted from the humidifier 5 together with air. Therefore, hydrogen concentration may be reduced in the exhaust gas due to dilution by air.

That is, when the vehicle is being started, driven, and stopped or in an idle state, the hydrogen exhausted from the fuel cells 2c inflows to the humidifier 5 together with the air exhausted from the fuel cells 2c, and hydrogen concentration is reduced by the air.

The fuel cell system 1 includes an exhaust system 9 so as to exhaust the gas (a gas containing hydrogen and air; hereinafter called an "exhaust gas") exhausted from the humidifier 5 to an atmosphere. Here, the exhaust gas contains water and water vapor as well as hydrogen and air.

The exhaust system 9 may include an exhaust line 9a arranged at a bottom of the vehicle from a front to a rear of the vehicle. The exhaust line 9a guides the exhaust gas from the front to the rear of the vehicle, and emits the exhaust gas to the atmosphere.

The exhaust line 9a may be formed as a pipe, and various parts, such as a muffler to reduce an exhaust noise, a sensor to detect a hydrogen concentration, may be installed in the exhaust line 9a.

When the vehicle is being started and stopped or in the idle state, the exhaust gas is exhausted from the exhaust system 9 at a low flow rate, which is a low flow rate and low pressure condition of the exhaust gas, and in this case, the exhaust gas contains hydrogen with relatively high concentration.

When the vehicle is driven, the exhaust gas is exhausted from the exhaust system 9 at a high flow rate, which is a high flow rate and high pressure condition of the exhaust gas, and in this case, the exhaust gas contains hydrogen with relatively low concentration.

Here, low flow rate/low pressure condition and high flow rate/high pressure condition of the exhaust gas may be determined by a consumed power by the air compressor or air blower of air supply unit 3.

In the disclosed embodiments, the above-described low flow rate/low pressure condition and high flow rate/high pressure condition may be clearly identified depending vehicle state (staring, driving, stopping, idle state), and thus the low flow rate/low pressure condition and the high flow rate/high pressure condition may not be limited to a specific value or range.

An apparatus 100 for reducing hydrogen concentration for an exhaust system of a fuel cell vehicle may be connected with an exhaust system 9 at a rear of the fuel cell vehicle.

By forming the apparatus 100 for reducing hydrogen concentration for an exhaust system of a fuel cell vehicle at the rear of the fuel cell vehicle, condensate water containing moisture in the exhaust gas may be exhausted rearward, and thus the condensate water may not be frozen in the course of the exhaust line.

By forming the apparatus 100 for reducing hydrogen concentration to be connected with the exhaust system 9 at the rear of the vehicle, the hydrogen contained in the exhaust gas may be maximally diluted by exterior air.

According to an apparatus 100 for reducing hydrogen concentration for an exhaust system of a fuel cell vehicle according to the disclosed embodiments, the hydrogen in the exhaust gas exhausted through the exhaust system 9 is diffused to, and diluted by, the exterior air, and thereby the hydrogen concentration may be effectively reduced.

Hereinafter, a surface toward a front of the fuel cell vehicle is called a front surface, and a surface toward a rear of the fuel cell vehicle is called a rear surface. In addition, "end" may be interpreted as a literal end or an area/section/region/portion that includes the literal end.

According to disclosed embodiments that are hereinafter described, the exhaust gas exhausted through the exhaust system 9 is guided toward a bumper at a rear portion of a vehicle and the hydrogen contained in the exhaust gas is diffused to, and diluted by, exterior air. In this regard, the bumper may be construed as a component of an exhaust system.

According to an apparatus 100 (200, 300, 400) for reducing hydrogen concentration for an exhaust system of a fuel cell vehicle according to the disclosed embodiments, the exhaust system 9 and the bumper at a rear portion of a vehicle 101 are connected. In addition, the apparatus 100 (200, 300, 400) may include an exhaust gas guiding unit 110 (210, 310, 410) to guide the exhaust gas exhausted through the exhaust system 9 toward a streamlined exterior surface of the bumper 101.

Figure 2:
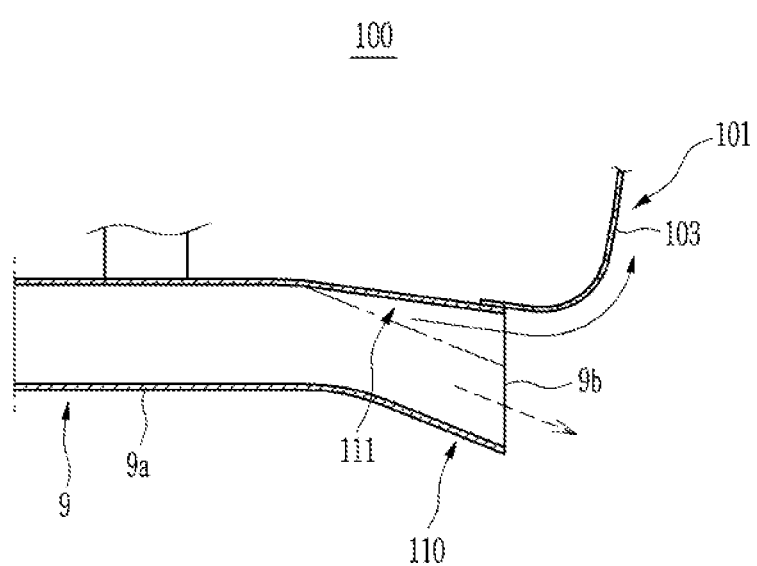
FIG. 2 is a schematic view of an apparatus for reducing hydrogen concentration in exhaust gas of an exhaust system of a fuel cell vehicle according to a first disclosed embodiment.

FIG. 2 is a schematic view of an apparatus for reducing hydrogen concentration in exhaust gas of an exhaust system of a fuel cell vehicle according to a first disclosed embodiment.

Referring to FIG. 1 and FIG. 2, an apparatus 100 for reducing hydrogen concentration for an exhaust system of a fuel cell vehicle according to a first disclosed embodiment includes an exhaust gas guiding unit 110 that guides the exhaust gas containing hydrogen along a streamlined exterior surface of the bumper cover 103 and diffuses the hydrogen to the exterior air to be diluted by the exterior air.

The bumper cover 103 is arranged at the bumper 101 at a rear portion of a fuel cell vehicle, where, for example, a front side of the bumper cover 103 is open and a rear surface forms a streamlined exterior surface upward. That is, the rear surface of the bumper cover 103 forms a curved surface in a vertical direction.

The exhaust gas guiding unit 110 includes an extension portion 111 that is formed by extending the exhaust end 9b of the exhaust system 9 toward a bottom of the bumper cover 103.

The extension portion 111 is provided at the rear end of the exhaust line 9a that is below the bumper 101 at a rear of the fuel cell vehicle, and extends the exhaust end 9b illustrated by a single-dot chain line to the bottom of the bumper cover 103.

Thus, the extension portion 111 connects the exhaust end 9b with the bottom of the bumper cover 103. By such a configuration, a diameter of the exhaust line 9a becomes larger as the exhaust line 9a goes rearward.

Because the extension portion 111 extending the exhaust end 9b of the exhaust system 9 to the bottom of the bumper cover 103 is formed at the rear end of the exhaust line 9a, the hydrogen contained in the exhaust gas exhausted by the exhaust end 9b may flow upward along the streamlined exterior surface of the bumper cover 103. Such a flow is enabled by a Coanda effect in which a stream close to a wall sticks to the wall.

The hydrogen exhausted together with the air through the exhaust line 9a of the exhaust system 9, being lighter than the air, flows upward along the streamlined exterior surface of the bumper cover 103 by the Coanda effect. The air and water are exhausted to an atmosphere through the exhaust end 9b.

Thus, according to a disclosed embodiment, the hydrogen contained in the exhaust gas exhausted by the exhaust end 9b of the exhaust system 9 flows upward along the streamlined exterior surface of the bumper cover 103, and therefore, the hydrogen is diffused to, and diluted by, ambient air (exterior air).

Therefore, hydrogen concentration in the exhaust gas exhausted to the atmosphere through the exhaust system 9 may be effectively reduced.

Figure 3B:
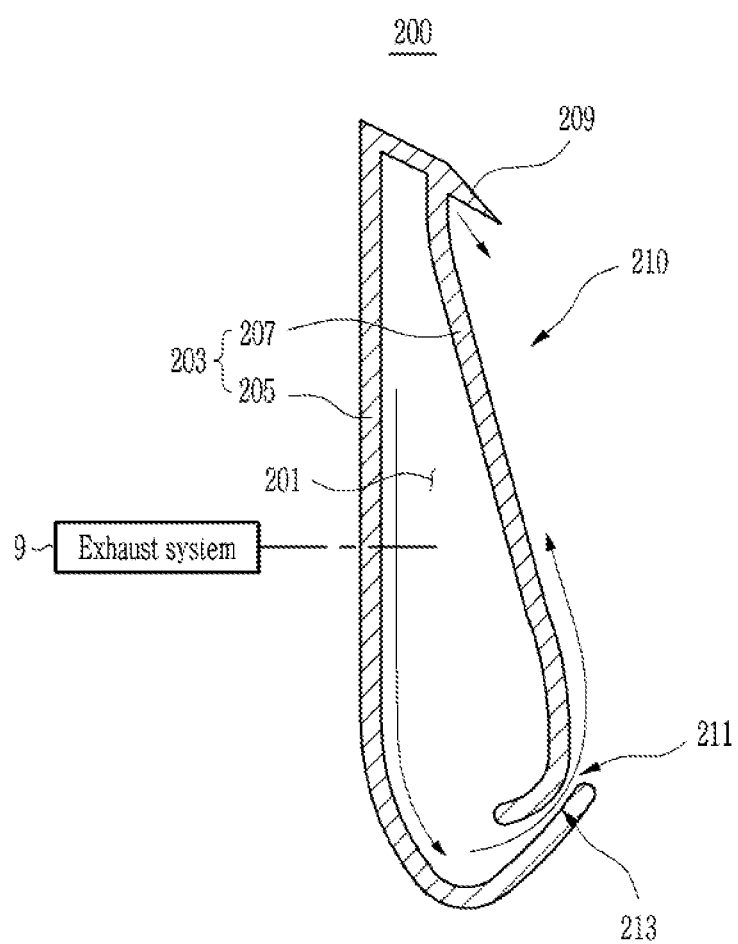

FIG. 3A and FIG. 3B are schematic views of an apparatus for reducing hydrogen concentration in exhaust gas of an exhaust system of a fuel cell vehicle according to a second disclosed embodiment.

Referring to FIG. 3A and FIG. 3B, an apparatus 200 for reducing hydrogen concentration for an exhaust system of a fuel cell vehicle according to a second disclosed embodiment includes a closed space 201 and a bumper cover 203. The closed space 201 is connected with the exhaust end 9b of the exhaust system 9. The bumper cover 203 has a streamlined exterior surface at a rear portion of a vehicle.

The present disclosed embodiment is provided with an air amplifier 211 for accelerating exterior air toward the streamlined exterior surface of the bumper cover 203.

The bumper cover 203 has a shape of a hollow round loop forming the closed space 201 as an interior space, and includes a front surface 205 formed as a flat surface and a rear surface 207 formed as the streamlined curved surface.

A side surface (not shown) of the bumper cover 203 opposite to a side connected to the exhaust end 9b is closed. A bottom of the bumper cover 203 where the streamlined curved surface (i.e., the rear surface 207) meets the front surface 205 has a roundish form. The exhaust end 9a of the exhaust system 9 is connected with a side (shown in the left) of the bumper cover 203, and the exhaust gas flows from the exhaust system 9 to the closed space 201 of the bumper cover 203.

The air amplifier 211 is formed at the bottom of bumper cover 203 along a length direction of the bumper cover 203. The air amplifier 211 forms a gap 213 along the length direction of the bumper cover 203 between the front surface 205 and the rear surface 207 of the streamlined curved surface. That is, the front surface 205 partially overlaps the rear surface 207 with the gap 213, and this overlapping portion forms the air amplifier 211.

While the exhaust gas flows from the exhaust system 9 into the closed space 201 of the bumper cover 203, the air amplifier 211 exhausts the inflowing exhaust gas to the streamlined exterior surface of the rear surface 207 through the gap 213, and also guides exterior air to the streamlined exterior surface.

The air amplifier 211 enables the exhaust gas emitted through the gap 213 to flow along the streamlined exterior surface of the rear surface 207, and thus hydrogen in the emitted gas is diffused to, and diluted by, the exterior air.

A blocking protrusion 209 is formed at a top of the bumper cover 203, so as to block the hydrogen flowing upward along the streamlined exterior surface of the rear surface 207, such that the hydrogen may not reach a trunk space (not shown).

The blocking protrusion 209 is integrally formed at the top of the bumper cover 203 along the length direction of the bumper cover 203, and is formed to be slanted downward to the rear of the bumper cover 203. Thus, the blocking protrusion 209 may block the hydrogen in the exhaust gas flowing along the streamlined exterior surface of the rear surface 207 and guide the hydrogen in the exhaust gas downward.

According to an apparatus 200 for reducing hydrogen concentration for an exhaust system of a fuel cell vehicle according to a second disclosed embodiment, the exhaust gas exhausted through the exhaust system 9 first flows in the closed space 201 of the bumper cover 203.

When the exhaust gas is emitted through the gap 213, a flow speed of the emitted exhaust gas is accelerated due to the round shape of the bulgy rear surface 207.

The acceleration of flow speed of the emitted gas inhales the exhaust gas from the closed space 201, and consequently, the exhaust gas is emitted from the closed space 201 through the gap 213 of the air amplifier 211 at a very high speed. The exhaust gas emitted through the gap 213 sticks to, and flows upward along, the streamlined exterior surface of the rear surface 207 by the Coanda effect. By emitting the exhaust gas at a high speed, a pressure at a rear of the streamlined curved surface of the rear surface 207 becomes lowered. Therefore, the air in vicinity of the rear surface 207 of the streamlined curved surface is inhaled toward the curved surface, and thereby a very strong stream is formed in an upward direction along the curved surface.

Such an air amplifier action to form the strong stream is apparent to a person of ordinary skill in the art, in view of the above-described arrangement of the present embodiment.

Thus, according to the present embodiment, the exhaust gas flowing into the bumper cover 203 is emitted through the gap 213 of the air amplifier 211 and flows upward along the streamlined exterior surface of the rear surface 207. At the same time, ambient air (exterior air) is guided along the streamlined exterior surface of the rear surface 207 by a strong stream.

As a result, the hydrogen in the exhaust gas emitted through the gap 213 of the air amplifier 211 is diffused to, and diluted by, the exterior air.

Meanwhile, while the exhaust gas flows upward along the streamlined exterior surface of the rear surface 207 and the hydrogen in the exhaust gas is diluted, the blocking protrusion 209 at the top of the bumper cover 203 blocks the exhaust gas to flow further upward, e.g., to flow into a trunk space (not shown). Then, the exhaust gas blocked by the blocking protrusion 209 flows into the atmosphere in a downward direction.

Figure 4:
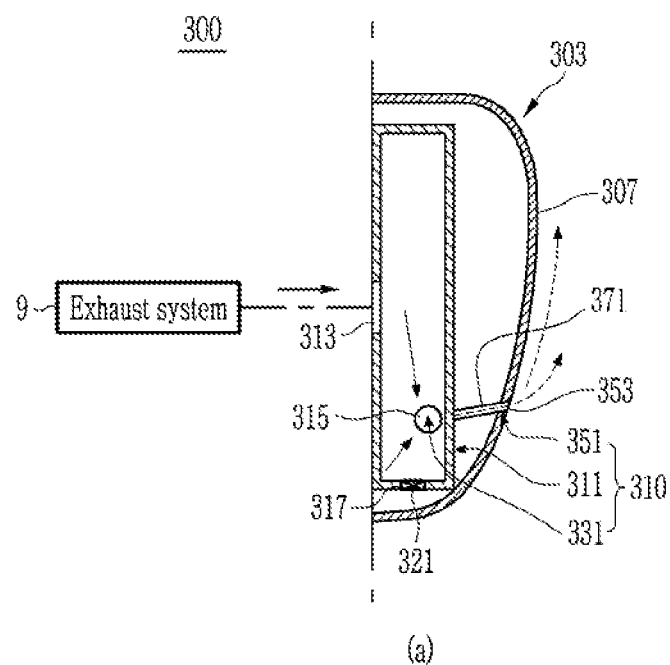
FIG. 4 is a schematic view of an apparatus for reducing hydrogen concentration in exhaust gas of an exhaust system of a fuel cell vehicle according to a third disclosed embodiment.
Figure 4:
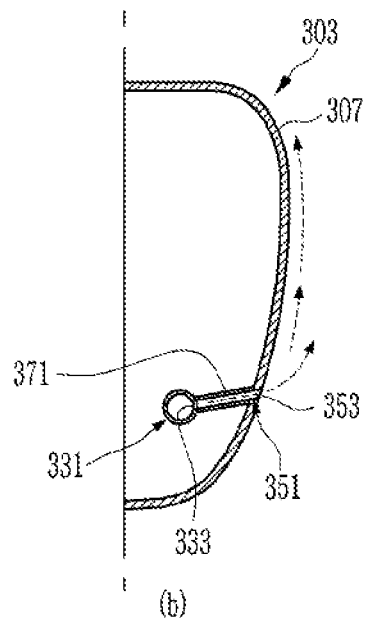

FIG. 4 is a schematic view of an apparatus for reducing hydrogen concentration in exhaust gas of an exhaust system of a fuel cell vehicle according to a third disclosed embodiment.

Referring to FIG. 4, an apparatus 300 for reducing hydrogen concentration for an exhaust system of a fuel cell vehicle according to a third disclosed embodiment is provided with an exhaust gas guiding unit 310. The exhaust gas guiding unit 310 receives the exhaust gas exhausted from the exhaust system 9 inside an interior space of the bumper cover 303, and guides the exhaust gas toward the streamlined exterior surface of the rear surface 307 of the bumper cover 303. The exhaust gas guiding unit 310 includes a collecting member 311, a passage member 331, and an exhaust portion 351.

The bumper cover 303 has an open front side and a closed rear surface 307. The rear surface 307 forms a streamlined exterior surface (curved surface).

In the present embodiment, the collecting member 311 collects the exhaust gas exhausted through the exhaust system 9. The collecting member 311 is provided at an interior of the bumper cover 303, and fixed to the bumper cover 303.

Figure 5:
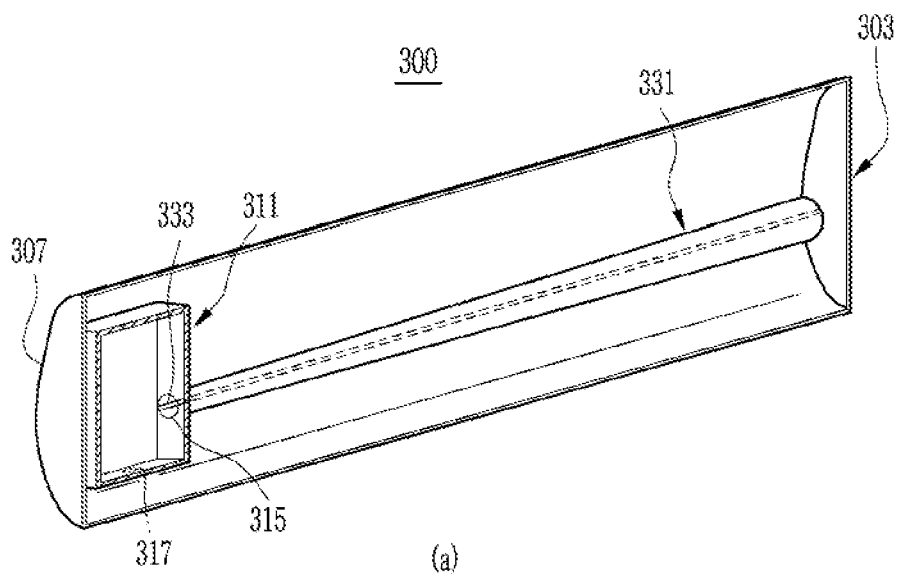
FIG. 5 is a perspective view of an example of an apparatus for reducing hydrogen concentration in exhaust gas of an exhaust system of a fuel cell vehicle according to a third disclosed embodiment.
Figure 5:
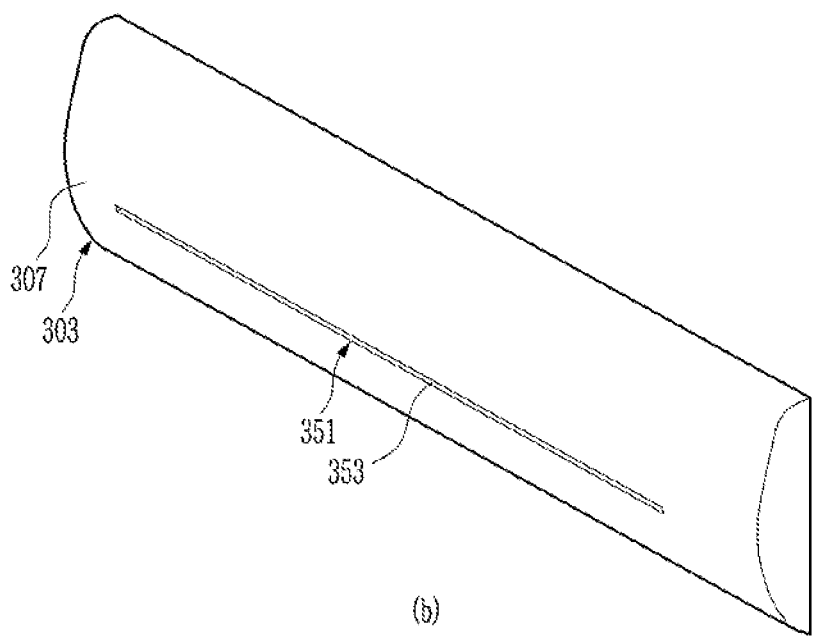
Figure 6:
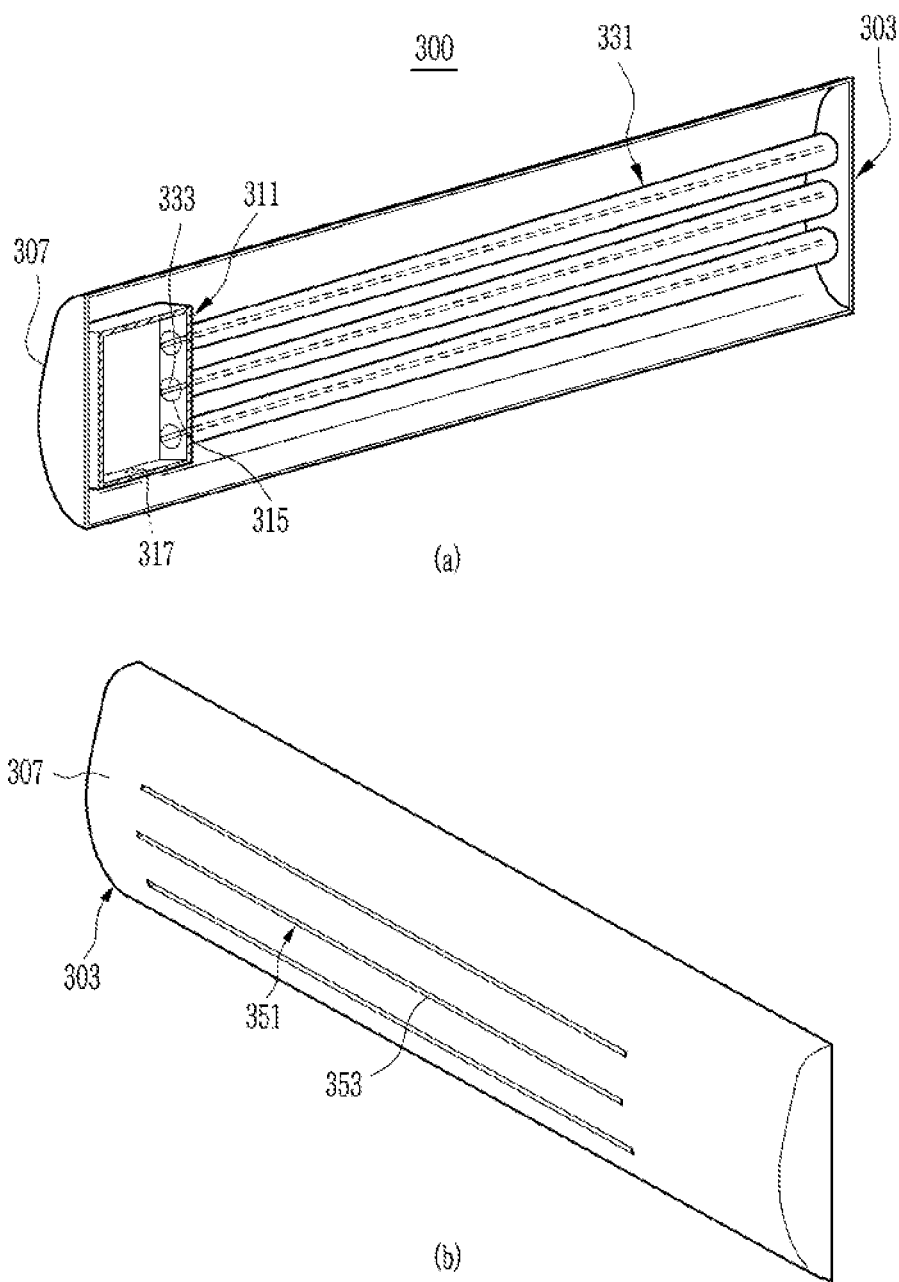
FIG. 6 is a perspective view of another example of an apparatus for reducing hydrogen concentration in exhaust gas of an exhaust system of a fuel cell vehicle according to a third disclosed embodiment.

The collecting member 311 is in the form of a closed housing, e.g., in a shape of a rectangular parallelepiped, although FIG. 5 and FIG. 6 illustrate the collecting member 311 to be open for the purpose of better understanding and illustration. Such a collecting member 311 includes a first port 313 connected with the exhaust system 9, a second port 315 connected with the passage member 331, and a third port 317 for draining moisture (water) contained in the exhaust gas.

The third port 317 is formed at a bottom surface of the collecting member 311, and a water trap valve 321 is installed at the third port 317 so as to open and close the third port 317 by an electrical signal.

When the third port 317 is closed by the water trap valve 321, moisture or water in the exhaust gas is collected inside the collecting member 311. When the third port 317 is opened by the water trap valve 321, the collected water in the collecting member 311 is drained through the third port 317.

In the present embodiment, the passage member 331 is formed along the length direction of the bumper cover 303 at an interior of the bumper cover 303, and is connected with the second port 315 of the collecting member 311. The passage member 331 allows the exhaust gas in the collecting member 311 to flow in a length direction of bumper cover 303, and one end of the passage member 331 is fixed to the bumper cover 303.

The passage member 331 is provided with a connection slit 333 formed along the length direction of the bumper cover 303, in order for exteriorly exhausting the exhaust gas. The connection slit 333 is connected with the exhaust portion 351.

As an example of an apparatus 300 for reducing hydrogen concentration for an exhaust system of a fuel cell vehicle according to a third disclosed embodiment, a single passage member 331 may be provided at the interior of the bumper cover 303, as shown in FIG. 4 and FIG. 5.

As another example of an apparatus 300 for reducing hydrogen concentration for an exhaust system of a fuel cell vehicle according to a third disclosed embodiment, a plurality of passage members 331 (e.g., three passage members 331) may be provided at the interior of the bumper cover 303, as shown in FIG. 6.

By employing the plurality of passage members 331 as shown in FIG. 6, a pressure difference for exhausting the exhaust gas from the exhaust system 9 to the passage member 331 through the collecting member 311 may be reduced, and noise caused by the flow of the exhaust gas may also be reduced.

As shown in FIG. 4 to FIG. 6, in the present embodiment, the exhaust portion 351 exhausts the exhaust gas through the connection slit 333 of the passage member 331 to an exterior of the rear surface 307 of the bumper cover 303.

The exhaust portion 351 includes an exhaust slit 353 connected with the connection slit 333 of the passage member 331. The exhaust slit 353 is formed at the rear surface 307 of the bumper cover 303 along the length direction thereof.

The exhaust slit 353 of the exhaust portion 351 is located upward and rearward with respect to the connection slit 333 of the passage member 331, and the exhaust slit 353 and the connection slit 333 are interconnected by the connection passage 371.

By connecting the connection slit 333 and the exhaust slit 353 in a slope by the connection passage 371, the exhaust gas exhausted through the exhaust slit 353 through the connection slit 333 and the connection passage 371 may easily flow upward along the streamlined exterior surface of the rear surface 307 of the bumper cover 303.

According to an apparatus 300 for reducing hydrogen concentration for an exhaust system of a fuel cell vehicle according to a third disclosed embodiment, the exhaust gas exhausted through the exhaust system 9 first flows into the collecting member 311 through the first port 313 of the collecting member 311.

Then, the exhaust gas flows into the passage member 331 through the second port 315 of the collecting member 311, and after flowing through the passage member 331, is exhausted to the exhaust slit 353 of the exhaust portion 351 through the connection slit 333 and the connection passage 371. Subsequently, the exhaust gas is exhausted to an exterior of the rear surface 307 of the bumper cover 303 through the exhaust slit 353.

Since the connection slit 333 and the exhaust slit 353 is interconnected by the connection passage 371 in a slope in the present embodiment, the exhaust gas exhausted from the exhaust slit 353 may be easily guided to the streamlined exterior surface of the rear surface 307 of the bumper cover 303.

As described above, the exhaust gas exhausted through the exhaust slit 353 of the exhaust portion 351 is guided to the streamlined exterior surface of the rear surface 307 of the bumper cover 303, and accordingly, the exhaust gas sticks to, and flows upward along, the streamlined exterior surface of the rear surface 307 by the Coanda effect.

In the present embodiment as described above, the exhaust gas flows upward along the streamlined exterior surface of the rear surface 307 of the bumper cover 303, and the hydrogen in the exhaust gas may be diffused to, and diluted by, the ambient air (exterior air).

In the present embodiment, moisture in the exhaust gas flowing into the collecting member 311 may be collected by closing the third port 317 of the collecting member 311 by the water trap valve 321.

In the present embodiment, water collected in the collecting member 311 may be drained through the third port 317 by opening the third port 317 of the collecting member 311 by the water trap valve 321.

Figure 7:
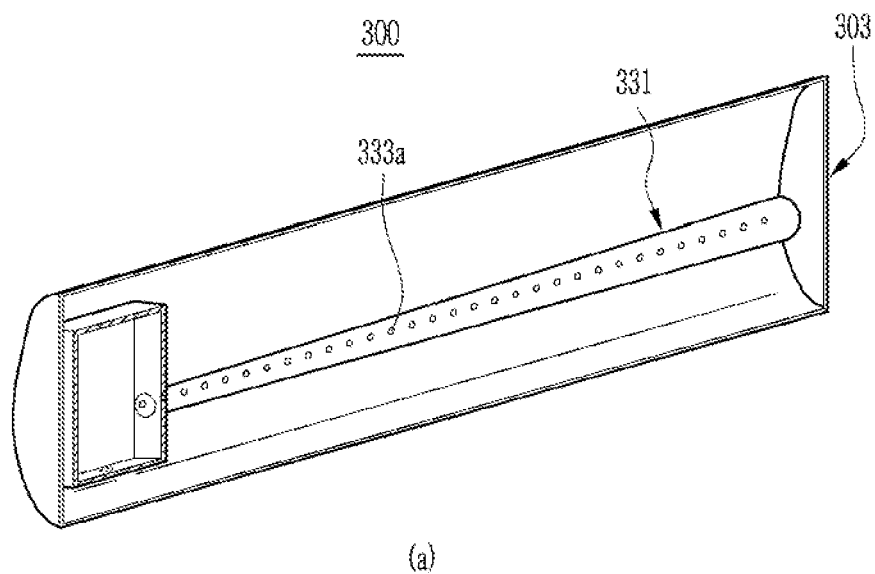
FIG. 7 is a perspective view of a yet another example of an apparatus for reducing hydrogen concentration in exhaust gas of an exhaust system of a fuel cell vehicle according to a third disclosed embodiment.
Figure 7:
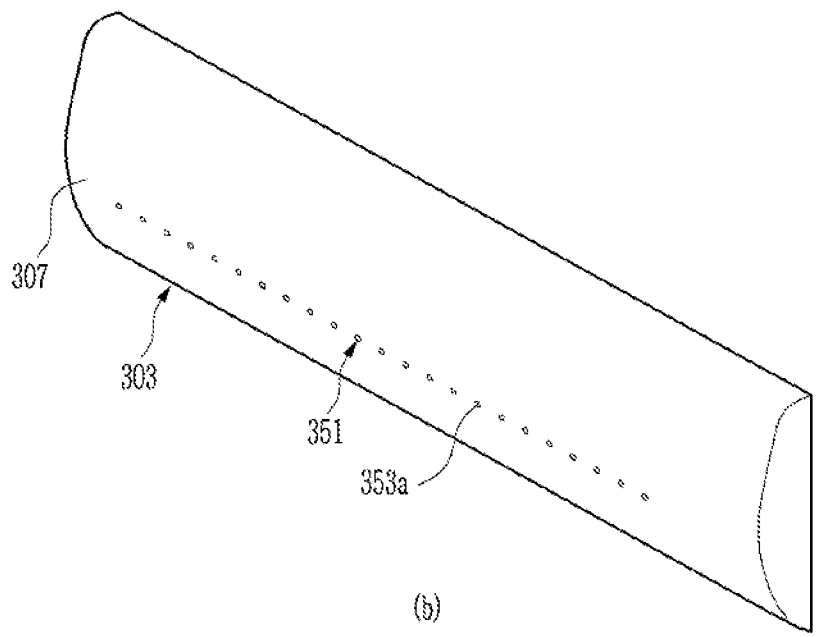

As a yet another example of an apparatus 300 for reducing hydrogen concentration for an exhaust system of a fuel cell vehicle according to a third disclosed embodiment, a plurality of connection holes 333a with a predetermined spacing may be formed along the length direction of the bumper cover 303, as the passage member 331 as shown in FIG. 7.

As the exhaust portion 351, a plurality of exhaust holes 353a may be formed along the length direction of the rear surface 307 of the bumper cover 303. The plurality of exhaust holes 353a may be formed apart by a predetermined spacing and connected with the connection holes 333a of the passage member 331.

The exhaust holes 353a are located upward and rearward with respect to the connection holes 333a, and are connected with the connection holes 333a by the connection passages 371 (refer to FIG. 4).

Figure 8:
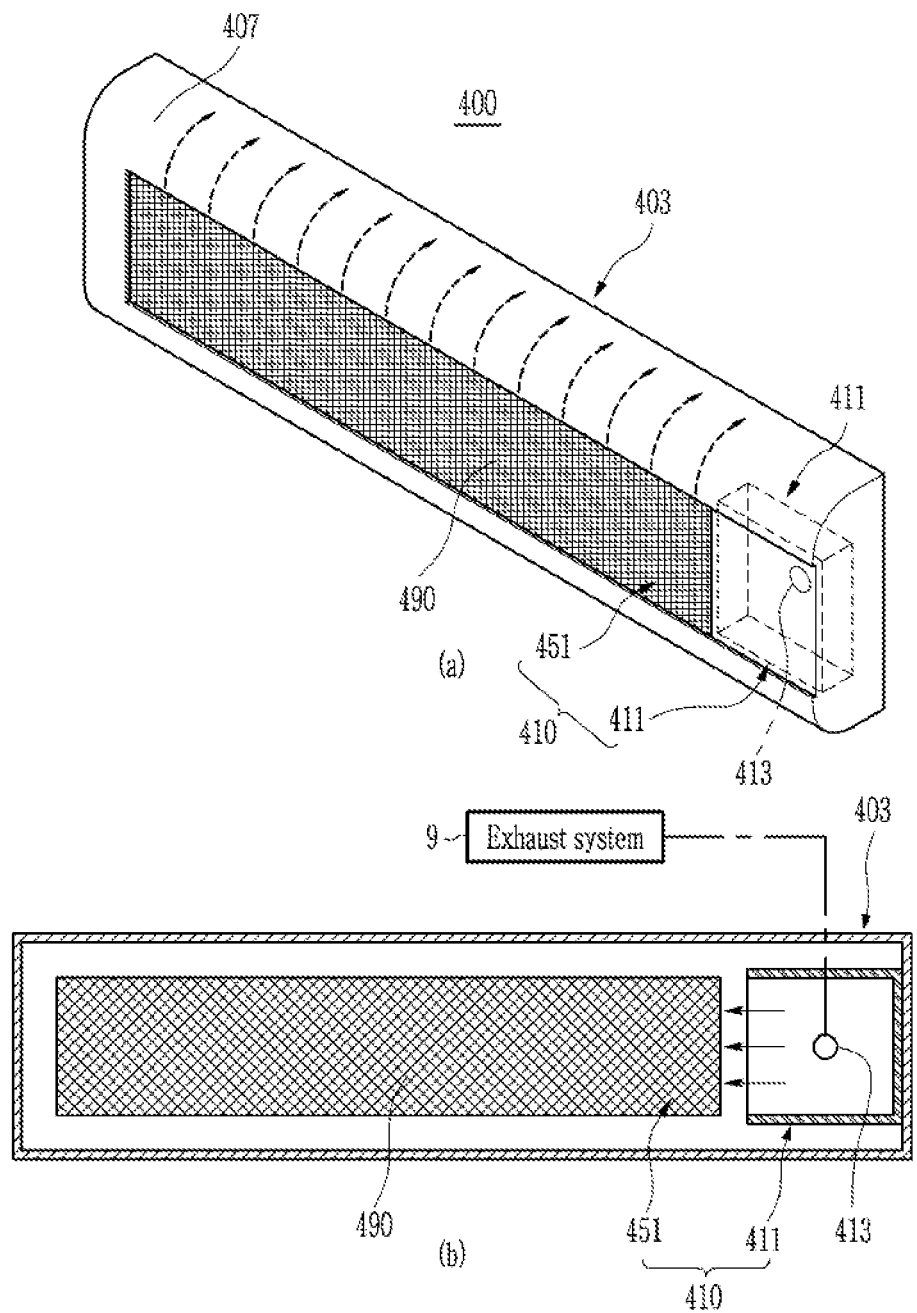
FIG. 8 is a schematic view of an apparatus for reducing hydrogen concentration in exhaust gas of an exhaust system of a fuel cell vehicle according to a fourth disclosed embodiment.

FIG. 8 is a schematic view of an apparatus for reducing hydrogen concentration in exhaust gas of an exhaust system of a fuel cell vehicle according to a fourth disclosed embodiment.

Referring to FIG. 8, an apparatus 400 for reducing hydrogen concentration for an exhaust system of a fuel cell vehicle according to a disclosed embodiment may include a exhaust gas guiding unit 410 including a collecting member 411 and a mesh type exhaust portion 451. The collecting member 411 is installed at an interior of the bumper cover 403, and the mesh type exhaust portion 451 is formed at a rear surface 407 of the bumper cover 403.

The collecting member 411 collects the exhaust gas exhausted from the exhaust system 9, and exhausts the exhaust gas toward an interior of the bumper cover 403.

The collecting member 411 is formed with an intake port 413 through which the exhaust gas exhausted from the exhaust system 9 flow into the collecting member 411. In addition, the collecting member 411 has an open face toward an interior of the bumper cover 403 such that the exhaust gas may be exhausted toward the interior of the bumper cover 403.

In the present embodiment, the exhaust portion 451 exhausts the exhaust gas exhausted to the interior of the bumper cover 403 through the collecting member 411 toward an exterior of the rear surface 407 of the bumper cover 403, and guides the exhaust gas to the streamlined exterior surface of the rear surface 407. The exhaust portion 451 may be realized as a mesh screen 490 formed at the rear surface 407 of the bumper cover 403.

According to an apparatus 400 for reducing hydrogen concentration for an exhaust system of a fuel cell vehicle according to a fourth disclosed embodiment, the exhaust gas exhausted from the exhaust system 9 is collected in the collecting member 411, and the collected exhaust gas is exhausted toward the interior of the bumper cover 403 through the open face of the collecting member 411.

Then, the exhaust gas is exhausted from the interior to the exterior of the rear surface 407 of the bumper cover 403 through the exhaust portion 451, and guided to the streamlined exterior surface of the rear surface 407. Then the exhausted gas sticks to and flows upward along the streamlined exterior surface of the rear surface 407 by the Coanda effect.

In the present embodiment as described above, the exhaust gas is exhausted to an exterior of the rear surface 407 of the bumper cover 403 through the mesh type exhaust portion 451, and flows upward along the streamlined exterior surface of the rear surface 407. Therefore, the hydrogen in the exhaust gas may be diffused to, and diluted by, the ambient air (exterior air).

While this disclosure has been described in connection with what are presently considered to be useful disclosed embodiments, it is to be understood that the disclosure is not limited to the disclosed embodiments, but, on the contrary, is intended to cover various modifications and equivalent arrangements included within the spirit and scope of the appended claims.

What is claimed is:

1. An apparatus for reducing hydrogen concentration in exhaust gas of an exhaust system of a fuel cell vehicle, the apparatus comprising:
   a collecting member installed at an interior of a bumper cover disposed at a rear portion of the fuel cell vehicle, the collecting member collecting the exhaust gas exhausted from the exhaust system;
   at least one passage member disposed in a length direction of the bumper cover at the interior of the bumper cover, the at least one passage member being connected with the collecting member so as to allow the collected gas to flow along the length direction; and
   an exhaust portion connected with the at least one passage member, the exhaust portion being formed along the length direction of the bumper cover, the exhaust portion exhausting the exhaust gas inside the at least one passage member, the exhaust portion guiding the exhausted gas toward the streamlined exterior surface of the bumper cover,
   wherein the exhaust portion comprises an exhaust slit formed along the length direction of the bumper cover,
   wherein each of the at least one passage member comprises a connection slit formed along the length direction of the bumper cover, the connection slit being connected with the exhaust slit, and
   wherein the exhaust slit is located upward and rearward with respect to the connection slit, such that the exhaust gas moves upward and rearward while flowing from the connection slit to the exhaust slit.

2. The apparatus of claim 1, wherein:
   the collecting member is fixed to the bumper cover at an interior of the bumper cover; and
   the at least one passage member is fixed to the bumper cover at the interior of the bumper cover.

3. The apparatus of claim 1, wherein the collecting member is configured as a housing, the housing comprising:
   a first port connected with the exhaust system;
   a second port connected with the at least one passage member; and
   a third port configured to drain moisture contained in the collected exhaust gas.

4. The apparatus of claim 3, further comprising a water trap valve disposed at the third port, the water trap valve being configured to selectively open and close the third port.

5. The apparatus of claim 1, wherein the connection slit and the exhaust slit are interconnected by a connection passage.

6. An apparatus for reducing hydrogen concentration in exhaust gas of an exhaust system of a fuel cell vehicle, the apparatus comprising:
   a collecting member installed at an interior of a bumper cover disposed at a rear portion of the fuel cell vehicle, the collecting member collecting the exhaust gas exhausted from the exhaust system;
   at least one passage member disposed in a length direction of the bumper cover at the interior of the bumper cover, the at least one passage member being connected with the collecting member so as to allow the collected gas to flow along the length direction; and
   an exhaust portion connected with the at least one passage member, the exhaust portion being formed along the length direction of the bumper cover, the exhaust portion exhausting the exhaust gas inside the at least one passage member, the exhaust portion guiding the exhausted gas toward the streamlined exterior surface of the bumper cover,
   wherein the exhaust portion comprises a plurality of exhaust holes formed with a predetermined spacing along the length direction of the bumper cover,
   wherein each of the at least one passage member is provided with a plurality of connection holes that is formed in the length direction and respectively connected with the plurality of exhaust holes, and
   wherein the plurality of exhaust holes is located upward and rearward with respect to the plurality of connection holes, such that the exhaust gas moves upward and rearward while flowing from the plurality of connection holes to the plurality of exhaust holes.

7. The apparatus of claim 6, wherein the plurality of connection holes and the plurality of exhaust holes are interconnected by a plurality of connection passages.

* * * * *